J. MAZZOCCO.
SPRING WHEEL.
APPLICATION FILED JUNE 7, 1921.
1,404,133.
Patented Jan. 17, 1922.
2 SHEETS—SHEET 1.
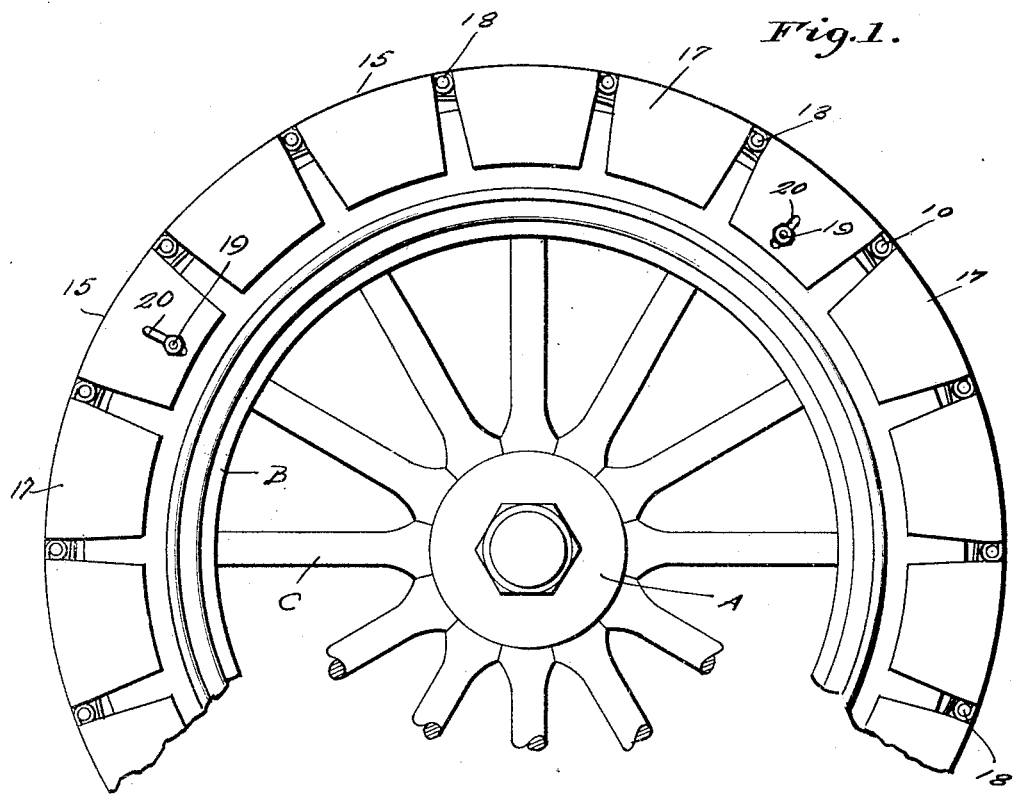
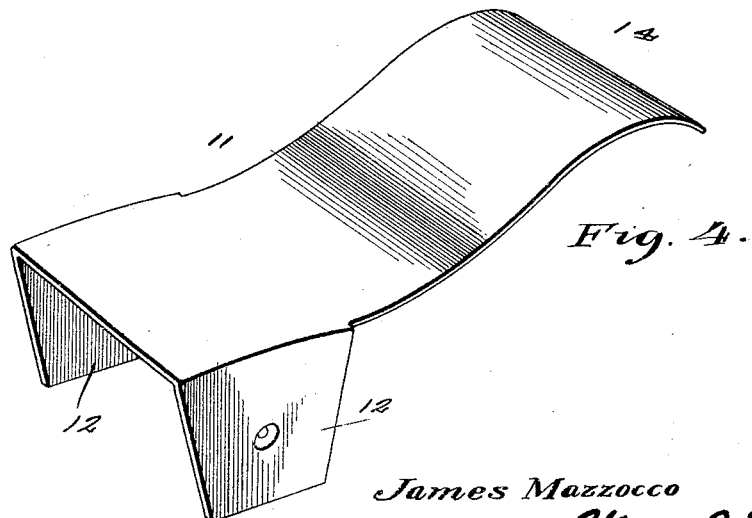
James Mazzocco INVENTOR
BY Victor J. Evans
ATTORNEY
R. A. Thomas
WITNESSES J. MAZZOCCO.
SPRING WHEEL.
APPLICATION FILED JUNE 7, 1921.
1,404,133.
Patented Jan. 17, 1922.
2 SHEETS—SHEET 2.
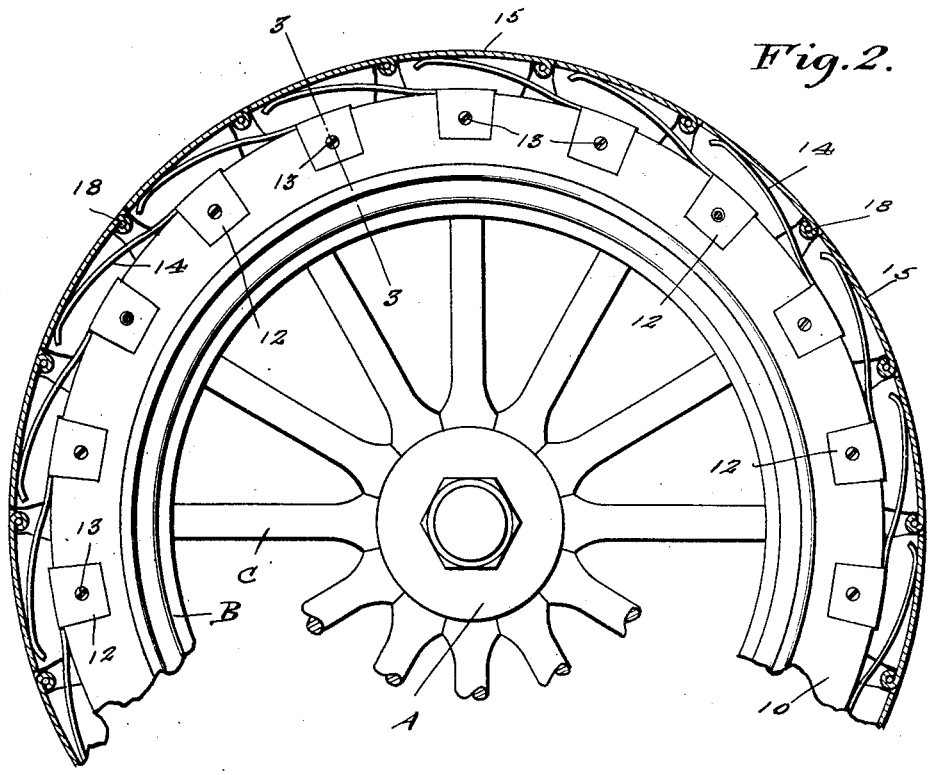
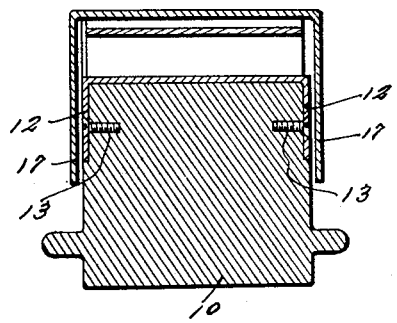
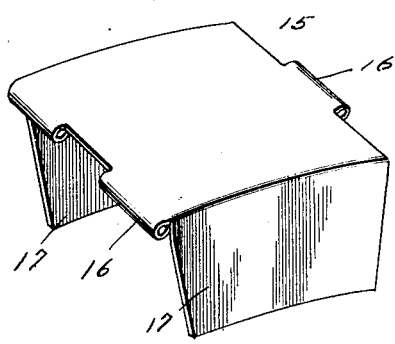
James Mazzocco INVENTOR
BY Victor J. Evans ATTORNEY
WITNESSES

UNITED STATES PATENT OFFICE.

JAMES MAZZOCCO, OF GALLUP, NEW MEXICO.

SPRING WHEEL.

1,404,133.   Specification of Letters Patent.   Patented Jan. 17, 1922.

Application filed June 7, 1921. Serial No. 475,702.

*To all whom it may concern:*

Be it known that I, JAMES MAZZOCCO, a citizen of the United States, residing at Gallup, in the county of McKinley and State of New Mexico, have invented new and useful Improvements in Spring Wheels, of which the following is a specification.

This invention relates to vehicle wheels, particularly to those of the resilient type, and has for its object the provision of a wheel equipped with a tire structure of spring like formation whereby to provide the maximum resilience and easy riding qualities while avoiding the use of the well known pneumatic tires which have the great disadvantage of being subject to punctures and blowouts.

An important and more specific object is the provision of a spring wheel which is armored, the armor being in the nature of a plurality of easily connected metallic sections extending entirely around the periphery of the wheel, these sections having free movement relatively to one another, and the sections furthermore acting to insure traction in mud or slippery ground and also serving to prevent skidding.

An additional object is the provision of a wheel of this character which will be simple and inexpensive in manufacture, highly efficient in use, durable in service and a general improvement in the art.

With the above and other objects in view, the invention consists in the details of construction to be hereinafter more fully described and claimed, and illustrated in the accompanying drawings in which:

Figure 1 is a side elevation of a portion of a wheel constructed in accordance with my invention, Figure 2 is a longitudinal sectional view, Figure 3 is a cross sectional view through one side of the wheel, Figure 4 is a detail perspective view of one of the spring members detached, and Figure 5 is a detail perspective view of one of the armor sections detached.

Referring more particularly to the drawings, the letter A designates the hub portion of a wheel and B designates a rim member which may be connected with the hub portion A by means of the usual spoke C or which may be connected therewith by means of suitable discs or the like as is preferred in some types of wheels. Secured upon the rim portion is a circular body 10 of wood, metal or other suitable material and of any desired cross sectional configuration though it is preferred that this body 10 be substantially rectangular in cross section. Secured upon the body 10 at spaced intervals are spring members designated broadly by the numeral 11. Each of these spring members is formed of a single strip or sheet of spring material stamped or otherwise formed at one end to be of a U-shape in cross section whereby to define ears 12 which are disposed against opposite sides of the body 10 and secured thereto as by means of screws 13 which pass through the ears and into the body. The other ends of the spring members 11 are elongated as clearly indicated at 14 and are arranged tangentially of the periphery of the body 10 so that the free ends will be disposed in spaced relation to the body. These spring members 11 are arranged about the periphery of the wheel in overlapping relation as clearly shown in Figure 2.

Disposed about the entire periphery of the body 10 is an armor structure comprising a plurality of sections 15 which are likewise formed of sheet metal cut and stamped to shape and of U-shape in cross section as clearly shown. Each of these sections 15 is formed at its ends with knuckles 16 and is formed at its sides with ears 17 which are disposed upon opposite sides of the body 10. The knuckles at the ends of adjacent members 15 are pivotally connected by means of suitable pintles 18 which may be removable if preferred or which may be fixed. These members 15, as mentioned above, extend around the entire periphery of the wheel and engage upon the projecting ends 14 of the spring members 11 as clearly shown in Figure 2. Certain of the members 15 are connected with the body 10 by means of bolts or pins 19 which extend through the side flanges or ears 17 and into the body 10, the flanges or ears 17 being formed with elongated radially extending slots 20 permitting free movement of the members 15.

In the operation of the wheel it will be seen that the spring members 11 will amply support the weight so as to insure resilience and easy riding, and that the armor formed by the plurality of sections 15 will not only form the tread for the wheel but will also serve to insure traction in mud or snow or any slippery places and also tend to prevent skidding. If preferred the outer surfaces of the members 15 might be formed roughened or ribbed, though such is not shown. In case of breakage of any of the spring members 11 it is of course obvious that by removing one of the pintles 18 the armor structure formed by the hingedly connected sections 15 may be removed and the broken spring replaced by a new one.

From the foregoing description and a study of the drawings it will be apparent that I have thus provided a simply constructed and consequently inexpensive spring wheel which may be built as the wheel proper or which may be built as a tire like structure adapted to be secured upon an ordinary wheel having a rim. It will be observed that ample resilience is provided and that there is practically nothing to get out of order.

While I have shown and described the preferred embodiment of the invention it is of course to be readily understood that I reserve the right to make such changes in the form, construction and arrangement of parts as will not depart from the spirit of the invention or the scope of the subjoined claims.

Having thus described the invention I claim:

1. A spring wheel structure comprising a circular body, a plurality of spring members secured thereto in spaced relation and each formed as an elongated leaf spring formed at one end with apertured ears engaged upon and secured to the body at opposite sides thereof, said spring members being tangentially arranged whereby their free ends will be in spaced relation to the periphery of the body, and a tread member surrounding the body at the periphery thereof, and engaging upon the free ends of said spring members, said tread member being formed of pivotally connected metallic sections.

2. A spring wheel structure comprising a circular body, a plurality of spring members secured thereon in spaced relation and each formed as an elongated leaf spring formed at one end with apertured ears engaged upon and secured to the body at opposite sides thereof, said spring members being tangentially arranged whereby their free ends will be in spaced relation to the periphery of the body, and a tread member surrounding the body at the periphery thereof, and engaging upon the free ends of said spring members, said tread member being formed of a plurality of metallic sections U-shaped in cross section and straddle-wise engaged upon the body, the sections having their ends formed with interengaging knuckles whereby the sections will be pivotally connected.

3. A spring wheel structure comprising a circular body, a plurality of spring members secured thereon in spaced relation and each formed as an elongated leaf spring formed at one end with apertured ears engaged upon and secured to the body at opposite sides thereof, said spring members having their free ends in spaced relation to the periphery of the body, and a tread member engaging upon the free ends of said spring members and formed of a plurality of metallic sections straddle-wise engaged upon the body and having their adjacent peripheral edges hingedly connected and having their adjacent side edges cut away along inclined lines.

In testimony whereof I affix my signature.

JAMES MAZZOCCO.